United States Patent
Barnes et al.

(10) Patent No.: US 12,275,065 B2
(45) Date of Patent: Apr. 15, 2025

(54) MODIFICATION OF PARTICLES FOR ADDITIVE MANUFACTURING

(71) Applicant: Forge Nano, Inc., Thornton, CO (US)

(72) Inventors: John Barnes, Broomfield, CO (US); Karen Buechler, Broomfield, CO (US); Christopher Gump, Broomfield, CO (US); Daniel Higgs, Broomfield, CO (US); Paul Nelson, Broomfield, CO (US); Wayne Simmons, Broomfield, CO (US)

(73) Assignee: Forge Nano, Inc., Thornton, CO (US)

( * ) Notice: Subject to any disclaimer, the term of this patent is extended or adjusted under 35 U.S.C. 154(b) by 901 days.

(21) Appl. No.: 17/259,164

(22) PCT Filed: Jul. 9, 2019

(86) PCT No.: PCT/US2019/041089
§ 371 (c)(1),
(2) Date: Jan. 9, 2021

(87) PCT Pub. No.: WO2020/014287
PCT Pub. Date: Jan. 16, 2020

(65) Prior Publication Data
US 2021/0387259 A1    Dec. 16, 2021

Related U.S. Application Data

(60) Provisional application No. 62/695,665, filed on Jul. 9, 2018.

(51) Int. Cl.
*B22F 12/41*    (2021.01)
*B22F 1/102*    (2022.01)
(Continued)

(52) U.S. Cl.
CPC .............. *B22F 12/41* (2021.01); *B22F 1/102* (2022.01); *B22F 1/145* (2022.01); *B22F 1/16* (2022.01);
(Continued)

(58) Field of Classification Search
CPC .......... B22F 12/41; B22F 1/102; B22F 1/145; B22F 1/16; B22F 10/14; B22F 10/16;
(Continued)

(56) References Cited

U.S. PATENT DOCUMENTS 6,613,383 B1    9/2003    George et al.
10,005,127 B2    6/2018    Dardas
(Continued)

OTHER PUBLICATIONS

Office Action in Japanese Patent Application No. JP2021523561A dated Jun. 20, 2023.
(Continued)

*Primary Examiner* — Adil A. Siddiqui
(74) *Attorney, Agent, or Firm* — Frank Rosenberg

(57) ABSTRACT

Atomic Layer Deposition (ALD) and Molecular Layer Deposition (MLD) provide precise and conformal coatings that are employed to modify the properties of powders for additive manufacturing (AM). We have surprisingly discovered that use of a limited number of ALD cycles can impart improved flowability. In various aspects, the coating may provide one or more advantages such as novel material properties, increased flowability, improved sintering, enhanced stability during storage, and prevention of premature sintering.

7 Claims, 3 Drawing Sheets

(51) Int. Cl.

| | |
|---|---|
| B22F 1/145 | (2022.01) |
| B22F 1/16 | (2022.01) |
| B22F 10/14 | (2021.01) |
| B22F 10/16 | (2021.01) |
| B22F 10/18 | (2021.01) |
| B22F 10/34 | (2021.01) |
| B22F 10/37 | (2021.01) |
| B22F 10/50 | (2021.01) |
| B22F 12/45 | (2021.01) |
| B33Y 10/00 | (2015.01) |
| B33Y 30/00 | (2015.01) |
| B33Y 70/00 | (2020.01) |
| B33Y 70/10 | (2020.01) |

(52) U.S. Cl.
CPC ............ *B22F 10/14* (2021.01); *B22F 10/16* (2021.01); *B22F 10/34* (2021.01); *B22F 12/45* (2021.01); *B33Y 10/00* (2014.12); *B33Y 30/00* (2014.12); *B33Y 70/00* (2014.12); *B33Y 70/10* (2020.01); *B22F 10/18* (2021.01); *B22F 10/37* (2021.01); *B22F 10/50* (2021.01)

(58) Field of Classification Search
CPC .......... B22F 10/34; B22F 12/45; B22F 10/18; B22F 10/37; B22F 10/50; B33Y 10/00; B33Y 30/00; B33Y 70/00; B33Y 70/10; C04B 2235/665; C04B 35/62805; C04B 35/62828; C04B 35/62884; C04B 35/62894; C04B 2235/6026; Y02P 10/25; B29C 64/165; B29C 64/205
See application file for complete search history.

(56) References Cited

U.S. PATENT DOCUMENTS

| | | | |
|---|---|---|---|
| 10,041,171 B2 | 8/2018 | She et al. | |
| 10,576,541 B2 | 3/2020 | Beals et al. | |
| 10,626,503 B2 | 4/2020 | Sharon et al. | |
| 10,946,584 B2 | 3/2021 | Ge et al. | |
| 2016/0279703 A1 | 9/2016 | Clare et al. | |
| 2016/0339517 A1 | 11/2016 | Joshi et al. | |
| 2017/0043395 A1 | 2/2017 | She et al. | |
| 2017/0175234 A1 | 6/2017 | Jennett et al. | |
| 2017/0281827 A1 | 10/2017 | Baker | |
| 2017/0368603 A1* | 12/2017 | Beals | B33Y 10/00 |
| 2018/0051376 A1* | 2/2018 | Sharon | B22F 1/16 |
| 2020/0276638 A1* | 9/2020 | King | B22F 1/17 |

OTHER PUBLICATIONS

Translation of Office Action in Japanese Application No. JP2021523561A dated Jun. 20, 2023.
Herrmann et al, "Multilayer and functional coatings on carbon nanotubes using atomic layer deposition" Appl. Phys. Lett. 87, 123110 (2005).
Cooke et al, "Properties of Metal Powders for Additive Manufacturing: A Review of the State of the Art of Metal Powder Property Testing." National Institute of Standards and Technology, 7873 (2012).
Ngo, Tuan et al, "Additive manufacturing (3D printing): A review of materials, methods, applications and challenges." Composites Part B: Engineering, vol. 143 (2018).
Debroy, T. et al, "Additive manufacturing of metallic components—Process, structure and properties." Progress in Materials Science, vol. 92 (2018).
Tan, X.P. et al, "Metallic powder-bed based 3D printing of cellular scaffolds for orthopaedic implants: A state-of-the-art review on manufacturing, topological design, mechanical properties and biocompatibility." Materials Science and Engineering: C, vol. 76 (2017).
Bhushan, Bharat et al, "An overview of additive manufacturing (3D printing) for microfabrication." Microsystem Technologies, vol. 23-4 (2017).
Gu et al, "Laser additive manufacturing of metallic components: materials, processes and mechanisms," International Materials Reviews, 57:3 (2012).
Perelaer et al, "Novel approaches for low temperature sintering of inkjet-printed inorganic nanoparticles for roll-to-roll (R2R) applications." Journal of Materials Research, 28:4 (2013).
Lewandowski et al, "Metal additive manufacturing: a review of mechanical properties," Annual Review Materials Research, 46:151-86 (2016).
Yung et al, "Additive and photochemical manufacturing of copper," Scientific Reports, 6:39584 (2016).
Kirka et al, "Solidification and solid-state transformation sciences in metals additive manufacturing," Scripta Materialia, 135 (2017).
Malladi et al, "3D metal printing technologies: a review," The IUP Journal of Mechanical Engineering, 10:1 (2017).
Martin et al, "3D printing of high-strength aluminum alloys," Nature, vol. 549 (2017).
Canter, Neil, "Manufacturing of aluminum alloys by 3D printing," Tribology & Lubrication Technology 74:1 (2018).
Chen et al, "Improving additive manufacturing processability of hard-to-process overhanging structure by selective laser melting," Journal of Materials Processing Technology, vol. 250 (2017).
Yang et al, "Additive manufacturing of metals: the technology, materials, design and production," Springer International Publishing (2017).
Zhang et al, "Additive manufacturing of metallic materials: a review," Journal of Materials Engineering and Performance, 27:1 (2018).
International Preliminary Report on Patentability from International Application No. PCT/US2019/041089 issued Jan. 12, 2021.
International Search Report from International Application No. PCT/US2019/041089 mailed Jan. 10, 2020.
Written Opinion from International Application No. PCT/US2019/041089 mailed Jan. 10, 2020.
Second Office Action in Japanese Patent Application No. JP2021523561A date of mailing Jan. 25, 2024.
Translation of Second Office Action in Japanese Application No. JP2021523561A date of mailing Jan. 25, 2024.
Office Action in Japanese Application No. JP2022539335A dated Jun. 18, 2024.
Translation of the Office Action in Japanese Application No. JP2022539335A dated Jun. 18, 2024.

* cited by examiner

MODIFICATION OF PARTICLES FOR ADDITIVE MANUFACTURING

RELATED APPLICATION

This application claims the priority benefit of U.S. Provisional Patent Application Ser. No. 62/695,665, filed 9 Jul. 2019.

INTRODUCTION

Additive manufacturing (AM), also known as solid freeform fabrication or 3D printing, refers to any manufacturing process where three-dimensional objects are built up from raw material (filaments, powders, liquids, suspensions, sheet or molten solids) in a series of two-dimensional layers or cross-sections. In contrast, traditional manufacturing techniques typically involve casting and molding or subtractive processes. This invention applies to 3D printing of metals, ceramics, and cermets, among others.

A variety of processes can be used in additive manufacturing, including: vat photopolymerization, materials extrusion, material jetting, binder jetting, powder bed fusion, direct energy deposition, and sheet lamination. These processes differ by the energy used to create layers and the type of feedstock employed, for example in the way layers are deposited to create a three-dimensional object, whether the created object requires subsequent densification or other refinement, and in the materials that are compatible for use in each process. Within the scope of these processes, some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA).

Other approaches for AM include binder jetting (or powder bed and inkjet 3D printing) and cold spray. Binder jetting uses a liquid binder sprayed in a pattern over the particles to create a "green body". After curing the binder, the green shape can either be sintered directly or in some cases an additional material or infiltrant can be used to create a matrix composite in a subsequent step. Cold spray falls under the directed energy deposition and uses the conversion of kinetic energy in lieu of a fusion source. Particles are joined by spraying high speed particles at/onto a substrate which could be incorporated into the final product.

Sintering is a densification process accomplished by using thermal energy below the melting temperature of the material for a prescribed time. When a powdered material is heated to a sufficient temperature in a sintering process, the atoms in the powder particles diffuse across the boundaries of adjacent particles, fusing the particles together to form a solid piece. In contrast to melting, the powder used in sintering need not reach a liquid phase. As the sintering temperature does not have to reach the melting point of the material, sintering is in commercial processes like metal injection molding (MIM) to create intricate, dense parts or for high melting temperature materials. Both sintering and melting can be used in additive manufacturing. SLM is used for additive manufacturing of metals or metal alloys (e.g. titanium, gold, steel, inconel, cobalt, chrome, etc.), which have a discrete melting temperature and typically undergo melting during the SLM process.

Ideal powders for 3D printing flow or spread well and have a defined powder size distribution (PSD). Flowability can be achieved or improved with spherical morphology, or large powders or certain size distributions. The main goal is to achieve a dense bed of powder. Metal powders can range in price up to hundreds of dollars per kg (e.g., titanium). Powders can be produced less expensively, however they tend not to have good flowability. Improving the flowability through coatings could enable lower cost processes to be used to make higher quality parts; thus enabling a significant advantage for additive manufacturing processing.

Post processing of 3D printed parts is also important to the ultimate strength and utility of the part. This can include processes such as heat treating to relieve internal stresses and strains created during the printing process as well as removing any surface flaws such a partially sintered metal or ceramic particles. Post processing may also include removal of parts from temporary 3D-printed supports.

SUMMARY OF THE INVENTION

Numerous inventive aspects are disclosed herein including deposition of films onto particles to modify core metal, ceramic and other powders to create superior properties for additive manufacturing. In various embodiments, the coating may provide one or more advantages such as novel material properties, increased flowability, improved sintering, enhanced stability during storage, and prevention of premature sintering.

In a first aspect, the invention provides a method of making a shaped object, comprising: providing a powder comprising core particles comprising a metal or ceramic core; reacting the powder with a first reactant (reactant A) following by reaction with a second reactant (reactant B) in a process of atomic (ALD) or molecular layer deposition (MLD) in a sequential manner to produce a powder comprising a ALD/MLD coating having alternating, bonded reactant A moieties and reactant B moieties; subjecting the coated powder to an additive manufacturing process to produce a shaped green product comprising core particles adhered together either: suspended in a matrix comprising the ALD/MLD coating, or sintered together in the shaped green product suspended in a powder bed comprising the powder comprising core particles having a metal or ceramic core and comprising a ALD/MLD coating having alternating, bonded reactant A moieties and reactant B moieties. The method may be further characterized by a limited number of ALD cycles and/or a flowability increase. Typically, the ALD/MLD coating imparts a flowability that is at least 10% higher than the flowability of the uncoated powder having a metal or ceramic core. We have discovered, surprisingly, that when ALD is conducted for 2 to about 50 cycles or about 25 cycles or 5 to 25 cycles, the resulting powders have enhanced flowability as compared to the uncoated powders and as compared to powders subjected to a higher number of cycles. In place of cycles, the particles can be characterized by the thickness of the ALD/MLD coatings which are preferably in the range of 0.2 nm to 5 or 10 nm. The flowability can be measured by the techniques that are described or referenced below.

Any of the inventive aspects (mentioned above or below) may, in some embodiments, be further characterized by one or any combination of the following features: the powder comprising the ALD/MLD coating, prior to the step of subjecting the coated powder to an additive manufacturing process, has a flowability that is at least 10%, or at least 20%, or at least 30% higher than the flowability of the uncoated powder having a metal or ceramic core; heating the shaped green product to cause the core particles to sinter together; wherein the core particles are metal and the particles or coating or both comprise at least 0.5 mass % of one or more rare earth element; wherein the coating has a higher melting temperature than the core; wherein the core particles comprises at least two compositionally different core particles and further wherein the compositionally different core particles comprise coatings that are compositionally identical; wherein the method comprises 2 to 25 cycles or 5 to 25 cycles of ALD or MLD (or wherein the coating has a thickness of about 0.2 nm to about 5 nm); wherein the core particles are metal and wherein the coating comprises at least 0.5 mass % of one or more rare earth element; wherein the coating comprises an imide or fluorinated organic moiety; wherein the powder comprises a pyrophoric metal core; wherein the additive manufacturing process comprises a cold spray process; wherein a laser is used to bind the powder to form a green intermediate product; and wherein the coating increases efficiency of absorption of the laser; wherein the ALD/MLD coating comprises an ABC configuration deposited by the ALD/MLD process; wherein the additive manufacturing process comprises a binder jet process in which the powder is propelled onto a surface; wherein the ALD/MLD coating comprises an element or compound that reduces surface tension during laser melting; further comprising applying a hydrophobic organic coating onto the ALD coating (this arrangement can be achieved, for example, by bonding a hydrophobic terminal group onto an ALD-applied metal oxide); and/or wherein the ALD/MLD coating comprises an oxide, metal fluoride, lanthanide, silane, silicide and other silicon containing materials, carbon-containing materials including, but not limited to, polymers (e.g., polyamides, polyethylenes, polyamides, polyureas, polyurethanes), hydrocarbons, polymers or fragments of amino acids or other biological-related molecules and polymers, and other materials), fluorinated polymers (e.g., fluoro or perfluoro-polyamides, -polyethylenes, -polyamides, -polyureas, -urethanes, -hydrocarbons). The term "polymers" includes oligomers, in other words—not a monomer, an organic compound having repeating units.

In another aspect, the invention provides an additive manufacturing system, comprising: a container comprising a core particles adhered together through coatings on the particles; wherein the particles comprise an ALD/MLD coating having alternating layers of reactant A moieties and reactant B moieties.

In a further aspect, the invention provides an additive manufacturing system, comprising: a container comprising a powder bed, wherein the powder bed comprises coated particles comprising metal or ceramic core particles comprising a ALD/MLD coating having alternating layers of reactant A moieties and reactant B moieties; and an energy source and patterning system adapted for applying energy to bond the coated particles into a 3-dimensional shape. In a preferred embodiment, the coating having alternating layers of reactant A moieties and reactant B moieties comprises a metal oxide, and further comprising an organic polymeric binder.

In another aspect, the invention provides a cermet, comprising: disrupted ceramic spheres having thicknesses in the range of 0.2 to 200 nm, preferably 0.5 to 100 nm; and a metallic phase; wherein the disrupted ceramic spheres are dispersed in the metallic phase. The metallic phase may comprise sintered particles surrounded by the disrupted ceramic spheres resulting in porosity that comprises interstices between the sintered particles. Preferably, at least 90 mass % of the disrupted ceramic spheres have thicknesses within 30%, preferably within 20%, of the mass average thickness of the disrupted ceramic spheres.

In a further aspect, the invention provides a method of making a shaped object, comprising: providing a powder comprising core particles comprising a metal or ceramic core and a surface coating; etching the particles; and using the etched particles in an additive manufacturing process. In some preferred embodiments, the core particles having a metal or ceramic core and a surface coating are particles being recycled an additive manufacturing process. Preferably, the surface coating is a native oxide; and the method further comprises subsequent to the step of etching the particles, reacting the powder with a first reactant (reactant A) following by reaction with an second reactant (reactant B) in a process of atomic (ALD) or molecular layer deposition (MLD) in a sequential manner to produce a coated powder comprising a ALD/MLD coating having alternating, bonded reactant A moieties and reactant B moieties; subjecting the coated powder to an additive manufacturing process to produce a shaped green product comprising core particles adhered together either: suspended in a matrix comprising the ALD/MLD coating, or sintered together in the shaped green product suspended in a powder bed comprising the powder comprising core particles having a metal or ceramic core and comprising a ALD/MLD coating having alternating, bonded reactant A moieties and reactant B moieties.

In another aspect, the invention provides a method of making a shaped object, comprising: providing first core particles having a first composition and comprising a metal or ceramic core and applying an ALD/MLD coating to the first core particles; providing second core particles having a second composition and having a metal or ceramic core and applying a ALD/MLD coating to the second core particles; wherein the ALD/MLD coating applied to the second core particles is the same as the ALD/MLD coating applied to the first core particles; and using a mixture of the coated first and second core particles in an additive manufacturing process.

In yet another aspect, the invention provides a method of making a shaped object, comprising: providing a powder comprising core particles comprising a metal or ceramic core; subjecting the coated powder to an additive manufacturing process to produce a shaped green product comprising core particles adhered together; reacting the shaped green product with a first reactant (reactant A) following by reaction with an second reactant (reactant B) in a process of atomic (ALD) or molecular layer deposition (MLD) in a sequential manner to produce a shaped green product comprising a ALD/MLD coating having alternating, bonded reactant A moieties and reactant B moieties.

In alternative embodiments of the invention, any of the inventive methods can be modified wherein the core comprises a polymer or other material.

The invention includes shaped articles made by any of the methods described herein. The invention includes additive manufacturing using any of the powders described herein.

The invention is sometimes described using the term "comprising" which means including; and in any of the inventive concepts the term "comprising" may, in narrower embodiments, be replaced by "consisting essentially of" to exclude elements that would substantially degrade the properties of a layer, or, in the narrowest embodiments as "consisting of."

DETAILED DESCRIPTION OF THE INVENTION

Figure 1:
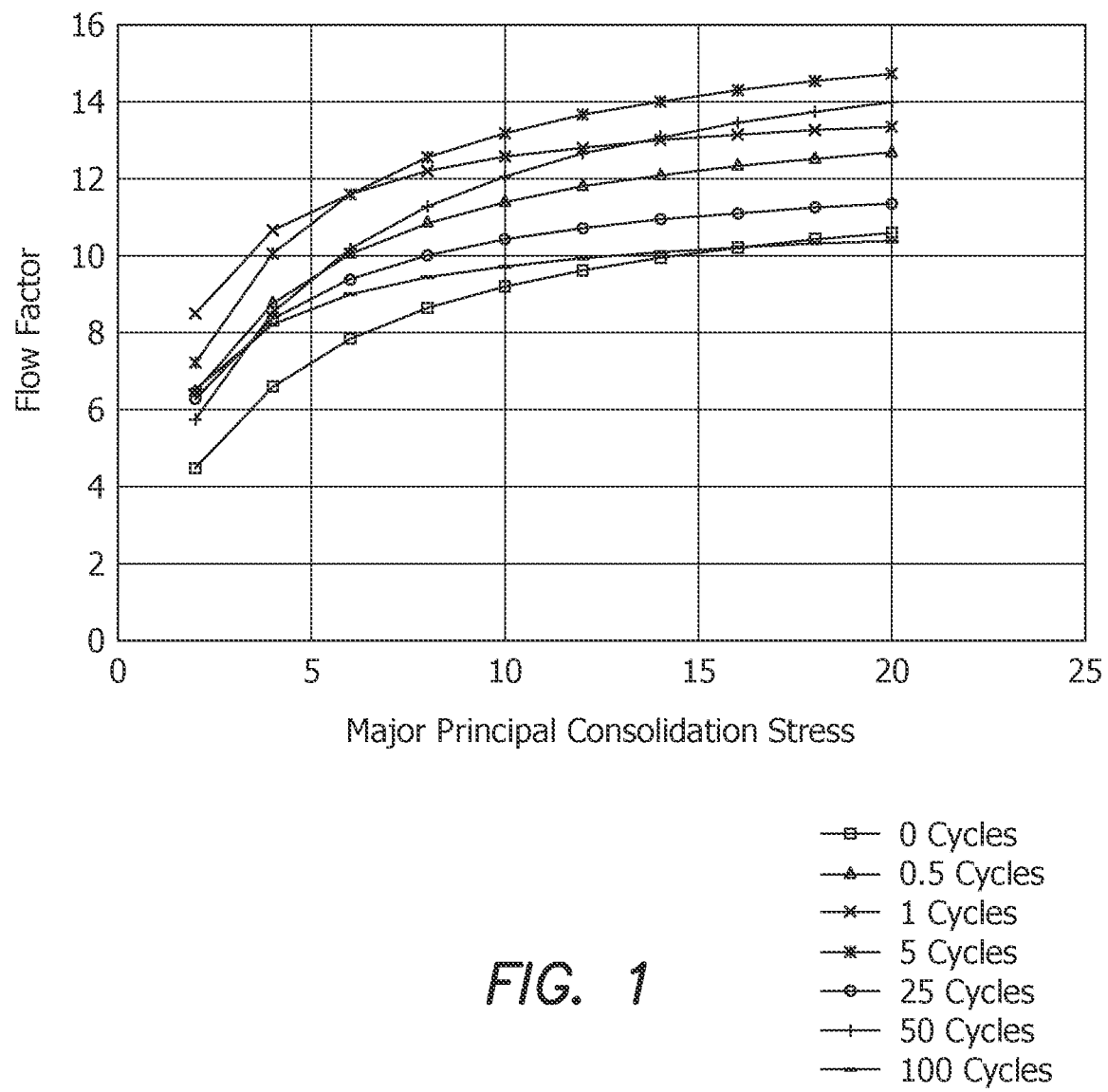
FIG. 1 shows the results from a Brookfield powder flow tester of and aluminum alloy powder coated with an ALD alumina coating. The graph shows the flow factors as a function of the major principal consolidation stress for ALD coatings applied using 0.5, 1, 25, 50, and 100 ALD cycles.

The powders of the invention can be any powders useful for additive manufacturing. Some preferred starting powders include:

3D Printing Metals/Alloys

| Tool and Stainless Steels | 17-4PH, Haynes188, low alloy steels, 304, 316L, 410, 440 15-5PH, 430, H13, maraging steel, AISI 420, AISI D2, AISI A2, AISI S7 |
|---|---|
| Nickel Super Alloys | Inconel 718, Inconel 625, Inconel 713, Inconel 738, Hastelloy X |
| Cobalt Chrome Alloys | CoCrMo, CoNiCrMo, CoCrW, CoCrWNi, CoNiCrMoTi, CoCrWC |
| Aluminum Alloys | AlSi10Mg, AlSi7Mg, AlSi7Mg, AlSi12, A1000, A2024, A6061 |
| Titanium and Titanium Alloys | Ti Gr1, Ti Gr2, Ti Gr3, Ti Gr4, Ti6Al4V, Ti6242, Ti5553, TiAl6Nb7 |
| Tungsten | Pure metal |
| Copper | Pure metal |
| Tantalum | Pure metal |
| Precious Metals Alloys | 18 carat gold, 930 sterling silver |

The listed materials are well known. For example, some preferred starting material powders are: EOS AlSi10Mg: Al (balance), Si (9-11 wt %), Mg (0.2-0.45 wt %); PSD: 34 μm (average) EOS Ti64: Ti (balance), Al (5.5-6.75 wt %), V (3.5-4.5 wt %) PSD: 45 μm (average) H13 Tool Steel: Fe (balance), Cr (5 wt %), Mo (1.5 wt %), V (1 wt %), Si (1 wt %); PSD: 16 μm (average)

Common ALD/MLD chemistries alone or in combination, which may be used in the present invention for use in 3D printing, include (but are not limited to):

| Metal Oxides | $Al_2O_3$, $SiO_2$, $NiO_x$, $CoO_x$, $WO_x$, $CrO_x$, $TiO_2$, $VO_x$, $CuO_x$, $TaO_x$, $ZnO$, $ZrO_2$, $HfO_2$, $NbO_x$, $LaO_x$, $YO_x$, $DyO_x$, |
|---|---|
| Metals | W, Mo, Ta |
| Metal Alkoxides | Alucones (Al), Titanicones (Ti), Vanadacones (V), Zincones (Zn), Zirconacones (Zr) |
| Metal Flourides | $AlF_3$, WF, $MgF_2$, $ZnF_2$ |
| Polymers | Polyamides, Flouropolymers, Polyrueas, Polyurethanes, |

The "polymers" may be oligomers comprising two or more repeating units. ALD chemistries are described in greater detail below.

1. General Description of Atomic or Molecular Layer Deposition

Atomic layer controlled growth techniques permit the deposition of coatings of about 0.1 to about 5 angstroms in thickness per reaction cycle, and thus provide a means of extremely fine control over coating thickness. Thicker coatings can be prepared by repeating the reaction sequence to sequentially deposit additional layers of the coating material until the desired coating thickness is achieved.

The coating is deposited in an Atomic Layer Deposition (ALD) or Molecular Layer Deposition (MLD) process. In the ALD/MLD process, the coating-forming reaction is conducted as a series of (typically) two half-reactions. In each of these half-reactions, a single reagent (precursor) is introduced into contact with the substrate surface. Conditions are such that the reagent is in the form of a gas. In most cases, the reagent reacts with functional groups on the surface of the particle and becomes bound to the particle. Because the reagent is a gas, it permeates into pores in the substrate and deposits onto the interior surfaces of the pores as well as onto the exterior surfaces of the substrate. This precursor is designed to react with the surface at all of the available surface sites but not react with itself. In this way, the first reaction occurs to form a single monolayer, or sub-monolayer, and creates a new surface functionality. Excess amounts of the reagent are then removed, which helps to prevent the growth of undesired, larger inclusions of the coating material. Each remaining half-reaction is then conducted in turn, each time introducing a first reagent, allowing it to react at the surface of the particle, and removing excess reagent before introducing the next reagent. Usually, an inert carrier gas is used to introduce the reagents, and the reaction chamber is usually swept with the carrier gas between successive reagent introductions to help remove excess reagents and gaseous reaction products. A vacuum may be pulled during and between successive dosings of reagents, to further remove excess reagents and gaseous reaction products.

After exposure to the first precursor, the surface is then exposed to the second precursor, also typically dispersed in an inert carrier gas. This precursor is designed to react with the functional groups put down in the first reaction step. This reaction also happens until all of the available surface sites are reacted. The second precursor also does not react with itself. Any excess of the second precursor is also removed in an optional inert gas purge step. If the gases are metered properly, the purge step may be unnecessary. This may be at least a 4 step process (precursor 1, purge, precursor 2, purge) to deposit one monolayer of the film which is being grown. This process is repeated as many times as is necessary to build up the desired film thickness. The ALD/MLD process may start with a "linker" agent that facilitates covalent bonding to the surface, or it may end with a terminating agent that may be hydrophobic or otherwise engineered for a specific purpose.

For purposes of the present invention, the ALD/MLD process may include only a half reaction, rather than a full cycle. However, at least one full cycle is preferred, more preferably at least five cycles.

A convenient method for applying the coating to a particulate substrate is to form a fluidized or otherwise agitated bed of the particles, and then pass the various reagents in turn through the fluidized bed under reaction conditions. Methods of fluidizing particulate materials are well known, and generally include supporting the particles on a porous plate or screen. A fluidizing gas is passed upwardly through the plate or screen, lifting the particles somewhat and expanding the volume of the bed. With appropriate expansion, the particles behave much as a fluid. Reagents (in gaseous, liquid, or solid phase) can be introduced into the bed for reaction with the surface of the particles. Liquid or solid reagents convert to gaseous form once inside the bed prior to reaction with particles. In this invention, the fluidizing gas also can act as an inert purge gas for removing unreacted reagents and volatile or gaseous reaction products. In addition, the reactions can be conducted at particle surfaces in a rotating cylindrical vessel, a rotating tube, or a vibrating bed. This vibrating bed method is particularly suitable for continuous processes.

Reaction conditions are selected mainly to meet three criteria. The first criterion is that the reagents are gaseous under the conditions of the reaction. Therefore, temperature and pressure conditions are selected such that the reactants volatilize before reaction. The second criterion is one of reactivity. Conditions, particularly temperature, are selected such that the desired reaction between the film-forming reagents (or, at the start of the reaction, the first-introduced reagent and the particle surface) occurs at a commercially reasonable rate. The third criterion is that the substrate is thermally stable, from a chemical standpoint and from a physical standpoint. The substrate should not degrade or react at the process temperature, other than a possible reaction on surface functional groups with one of the ALD precursors at the early stages of the process. Similarly, the substrate should not melt or soften at the process temperature, so that the physical geometry, especially pore structure, of the substrate is maintained. The reactions are generally performed at temperatures from about 270 to 1000 K, preferably from 290 to 450 K, with specific temperatures in each case being below the temperature at which the substrate melts, softens or degrades.

Between successive dosings of the reagents, the particles are subjected to conditions sufficient to remove reaction products and unreacted reagents. This can be done, for example, by subjecting the particles to a high vacuum, such as about $10^{-5}$ Torr or greater, after each reaction step. Another method of accomplishing this, which is more readily applicable for industrial application, is to sweep the particles with an inert purge gas between the reaction steps. This purge gas can also act as a fluidizing medium for the particles and as a carrier for the reagents.

Several techniques are useful for monitoring the progress of the reaction. For example, vibrational spectroscopic studies can be performed using transmission Fourier transform infrared techniques. The deposited coatings can be examined using in situ spectroscopic ellipsometry. Atomic force microscopy studies can be used to characterize the roughness of the coating relative to that of the surface of the substrate. X-ray photoelectron spectroscopy and x-ray diffraction can be used to do depth-profiling and ascertain the crystallographic structure of the coating.

Aluminum oxide coatings are conveniently deposited using trimethylaluminum and water as the precursors, as illustrated by reaction sequence A1/B1. The illustrated reactions are not balanced, and are only intended to show the reactions at the surface of the substrate (i.e., not inter- or intralayer reactions).

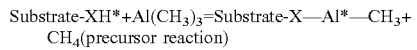
Substrate-XH*+Al(CH$_3$)$_3$=Substrate-X—Al*—CH$_3$+ CH$_4$(precursor reaction)

Substrate-X—Al*—CH$_3$+H$_2$O=Substrate-X—Al— OH*+CH$_4$  (A1)

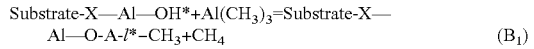
Substrate-X—Al—OH*+Al(CH$_3$)$_3$=Substrate-X— Al—O-A-*l*-CH$_3$+CH$_4$  (B$_1$)

In reactions A1/B$_1$, X is typically oxygen, nitrogen or sulfur, and the asterisk (*) represents the surface species at which the next half-reaction can occur. An aluminum oxide film is built up by repeating reactions A1 and B$_1$ in alternating fashion, until the desired coating thickness is achieved. Aluminum oxide films tend to grow at a rate of approximately 0.3 nm/cycle using this reaction sequence.

Titanium oxide coatings are conveniently deposited using titanium tetrachloride and water and/or hydrogen peroxide as the precursors, as illustrated by reaction sequence A2/B2. As before, the illustrated reactions are not balanced, and are only intended to show the reactions at the surface of the particles (i.e., not inter- or intralayer reactions).

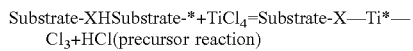
Substrate-XHSubstrate-*+TiCl$_4$=Substrate-X—Ti*— Cl$_3$+HCl(precursor reaction)

Substrate-X—Ti*—Cl$_3$+H$_2$O$_2$=Substrate-X-T-*i*- OH+HCl+Cl$_2$  (A2)

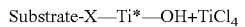
Substrate-X—Ti*—OH+TiCl$_4$

Substrate-X—Ti—O—Ti*—Cl$_3$+—HCl  (B$_2$)

In reactions A2/B$_2$, X is typically oxygen, nitrogen or sulfur, and the asterisk (*) represents the surface species at which the next half-reaction can occur. A titanium oxide film is built up by repeating reactions A2 and B$_2$ in alternating fashion, until the desired coating thickness is achieved. Titanium oxide films tend to grow at a rate of approximately 0.05-0.1 nm/cycle using this reaction sequence.

As is known for ALD/MLD processes, the order can be AB, ABC, ABCD, ABCDABABCD, or any desired order provided that the chemical entities react with each other in the desired order. Each of the reactants has at least two reactive moieties (this includes the possibility that the reactant is modifiable to have two reactive moieties such as having a first reactive moiety and a second reactive moiety that is temporarily blocked by a protecting group or requires activation for subsequent reaction such as UV activation). In some preferred embodiments, the reactants have exactly two reactive moieties since higher numbers of reactive groups may lead to lower packing density. In some preferred embodiments, the films have at least three repeating units (e.g., ABABAB), or at least 5, or at least 10, or at least 50, and sometimes in the range of 2 to 1000, or 5 to 100. By "reactive" it is meant under normal MLD conditions and commercially relevant timescales (for example, at least 50% reacted within 10 hours under appropriate reaction conditions). For control of film quality, the reactants may be singly reactive during each step of the MLD process to avoid reacting twice to the surface, and the reactants should not self-react and condense onto the surface.

In some preferred embodiments, the reactive moieties for Reactant A may comprise: isocyanates (R—NCO), acrylates, carboxylic acids, esters, epoxides, amides and amines, and combinations thereof. In some preferred embodiments, Reactant A comprises a diisocyanate, a diacrylate, a dicarboxylic acid, a diester, diamide or a diamine. In some preferred embodiments, the reactive moieties on Reactant B comprise: alcohols or amines, and combinations thereof. In some preferred embodiments, Reactant B comprises a diol, an amine alcohol, or a diamine.

In some cases, especially for MLD, the vapor phase reactants are selected react only monofunctionally with the substrate or growing polymer chain, i.e., only one group or moiety on the vapor phase reactant is capable of reacting with the substrate or growing polymer chain under the conditions of the reaction. This prevents unwanted cross-linking or chain termination that can occur when a vapor phase reactant can react polyfunctionally. A reactant is considered to react "monofunctionally" if during the reaction the reactant forms a bond to only one polymer chain, and does not self-polymerize under the reaction conditions employed. As explained more fully below, it is possible in certain embodiments of the invention to use a vapor phase reactant that can react difunctionally with the substrate or growing polymer chain, provided that the vapor phase reactant contains at least one additional functional group. Reactants that have exactly two functional groups which have approximately equal reactivity are preferably avoided in this aspect of invention.

A first class of suitable vapor phase reactants are compounds having two different reactive groups, one of which is reactive with a functional group on the substrate or polymer chain and one of which does not readily react with a functional group on the polymer chain but is reactive with a functional group supplied by a different vapor phase reactant. Examples of reactants of this class include:

a) Hydroxyl compounds having vinyl or allylic unsaturation. These can react with a carboxylic acid, carboxylic acid halide, or siloxane group to form an ester or silicone-oxygen bond and introduce vinyl or allylic unsaturation onto the polymer chain. Alternatively, the unsaturated group can react with a primary amino group in a Michaels reaction to extend the polymer chain and introduce a hydroxyl group onto the chain.

b) Aminoalcohol compounds. The amino group can react with a carboxyl group, a carboxylic acid chloride, a vinyl or allylic group, or an isocyanate group, for example, to extend the polymer chain and introduce a hydroxyl group onto the chain. Alternatively, the hydroxyl group can react with a siloxane species to form a silicon-oxygen bond and introduce a free primary or secondary amino group.

A second class of suitable vapor phase reactants includes various cyclic compounds which can engage in ring-opening reactions. The ring-opening reaction produces a new functional group which does not readily react with the cyclic compound. Examples of such cyclic compounds include, for example:

a) Cyclic azasilanes. These can react with a hydroxyl group to form a silicon-oxygen bond and generate a free primary or secondary amino group.

b) Cyclic carbonates, lactones and lactams. The carbonates can react with a primary or secondary amino group to form a urethane linkage and generate a free hydroxyl group. The lactones and lactams can react with a primary or secondary amino group to form an amide linkage and generate a free hydroxyl or amino group, respectively.

A third class of vapor phase reactants includes compounds that contain two different reactive groups, both of which are reactive with a functional group on the polymer chain, but one of which is much more highly reactive with that functional group. This allows the more reactive of the groups to react with the functional group on the polymer chain while leaving the less reactive group unreacted and available for reaction with another vapor phase reactant.

A fourth class of vapor phase reactants includes compounds that contain two reactive groups, one of which is blocked or otherwise masked or protected such that it is not available for reaction until the blocking, masking or protective group is removed. The blocking or protective group can be removed chemically in some cases, and in other cases by thermally decomposing the blocking group to generate the underlying reactive group, by radiating the group with visible or ultraviolet light, or in a photochemical reaction. The unprotected group may be, for example, an amino group, anhydride group, hydroxyl group, carboxylic acid group, carboxylic anhydride group, carboxylic acid ester group, isocyanate group and the like. The protected group may be one which, after removal of the protective group, gives rise to a functional group of any of the types just mentioned.

A reactant of this fourth class may, for example, have a hydroxyl group protected by a leaving group such as a benzyl, nitrobenzyl, tetrahydropyranyl, —$CH_2OCH_3$ or similar group. In these cases, the hydroxyl group can be deprotected in various ways, for example by treatment with HCl, ethanol, or in some cases, irradiation. Carboxyl groups can be protected with leaving groups such as —$CH_2SCH_3$, t-butyl, benzyl, dimethylamino and similar groups. These groups can be deprotected by treatment with species such as trifluoroacetic acid, formic acid, methanol or water to generate the carboxylic acid group. Amino groups can be protected with groups such as R—OOC—, which can be removed by reaction with trifluoroacetic acid, hydrazine or ammonia. Isocyanate groups can be protected with carboxyl compounds such as formic acid or acetic acid.

A fifth class of vapor phase reactants contains a first functional group, and a precursor group at which a further reaction can be conducted to produce a second functional group. In such a case, the first functional group reacts to bond to the polymer chain, and chemistry is then performed at the precursor group to generate a second functional group. The first functional group can be any of the types mentioned before, including a siloxane group, amino group, anhydride group, hydroxyl group, carboxylic acid group, carboxylic anhydride group, carboxylic acid ester group, isocyanate group and the like. A wide variety of precursor groups can be present on this type of reactant.

The precursor group may be one that it does not itself react with the polymer chain, but it can be converted to a functional group that can react with another vapor phase reactant to grow the chain. Two notable types of precursor groups are vinyl and/or allylic unsaturation, and halogen substitution, especially chlorine or bromine. Vinyl and allylic unsaturation can be converted to functional groups using a variety of chemistries. These can react with ozone or peroxides to form carboxylic acids or aldehydes. They can also react with ammonia or primary amino to produce an amine or imine. Halogens can be displaced with various functional groups. They can react with ammonia or primary amine to introduce an amino group, which can in turn be reacted with phosgene to produce an isocyanate group, if desired.

Reactants that are used to convert a precursor group to a functional group or to demask or deprotect a functional group, are introduced in the vapor phase. Excess reactants of this type are removed prior to the introduction of the next reactant, typically by drawing a high vacuum in the reaction zone, purging the chamber with a purge gas, or both. Reaction by-products are removed in the same manner, before introducing the next reactant into the reaction zone In some preferred embodiments at least one or all of the reactants in the MLD repeating units have chain lengths between reactive moieties of from 2 to 20 atoms (typically carbon atoms although heterogroups such as oxygen may be present), or from 2 to 10 atoms, or from 2 to 5 atoms. In some preferred embodiments, the reactants have straight chains (i.e., no branching) between reactive moieties to enhance packing density. In some preferred embodiments, the chains between reactive moieties are non-reactive; however, in some embodiments, there may be moieties within the chains that are capable of cross-linking to adjacent chains. In some embodiments, the capping layer and/or the MLD layers at or very near the surface (e.g., within 5 cycles or within 2 cycles of the capping layer or surface) are branched for enhanced hydrophobicity.

An inorganic layer applied to the particle in a first step preferably becomes covalently bonded to the substrate. Covalent bonding can occur when the first-to-be-applied precursor compound reacts under the conditions of the atomic layer deposition process with a functional group on the surface of the substrate. Examples of such functional groups are, for example, hydroxyl, carbonyl, carboxylic acid, carboxylic acid anhydride, carboxylic acid halide, primary or secondary amino.

Some ALD coatings are aluminum oxide and/or titanium oxide coatings. "Aluminum oxide" is used herein to designate a coating that is made up substantially entirely of aluminum and oxygen atoms, without reference to the specific stoichiometry. In many cases, it is expected that an aluminum oxide coating will correspond somewhat closely to the empirical structure of alumina, i.e., $Al_2O_3$, although deviations from this structure are common and may be substantial. "Titanium oxide" is used herein to designate a coating that is made up substantially entirely of titanium and oxygen atoms, without reference to the specific stoichiometry. In most cases, it is expected that a titanium oxide coating will correspond closely to the empirical structure of titania, i.e., $TiO_2$, although deviations from this structure are common and may be substantial. Similarly, considerations apply to understanding the other formulations described herein; although in some embodiments, the invention can be more specifically defined by the use of terms such as "consisting."

Except for the case of a half-reaction included in the broader aspects of the present invention, the atomic layer deposition process is characterized in that at least two different reactants are needed to form the coating layer. The reactants are introduced into the reaction zone individually, sequentially and in the gas phase. Excess amounts of reactant are removed from the reaction zone before introducing the next reactant. Reaction by-products are removed as well, between successive introductions of the reagents. This procedure ensures that reactions occur at the surface of the substrate, rather than in the gas phase.

A purge gas is typically introduced between the alternating feeds of the reactants, in order to further help to remove excess reactants. A carrier gas, which is usually but not necessarily the same as the purge gas, generally (but not always necessarily) is introduced during the time each reactant is introduced. The carrier gas may perform several functions, including (1) facilitating the removal of excess reactant and reaction by-products and (2) distributing the reactant through the reaction zone, thereby helping to expose all surfaces to the reactant. The purge gas does not react undesirably with the ALD reactants or the deposited coating, or interfere with their reaction with each other at the surface of the substrate.

Temperature and pressure conditions will depend on the particular reaction system, as it remains necessary to provide gaseous reactants. As is known for ALD/MLD processes, the temperature should be high enough to enable reactants in the gas phase but not so high that the product degrades.

2. Particle and Coating Characteristics

The core particles, in some embodiments are metallic and preferably comprise one or more transition metal, alkali metal, alkali earth metal, post-transition metal, or semi-metal elements. Preferred elements include: copper, aluminum, silicon, titanium, chromium, iron, cobalt, nickel, molybdenum, tungsten, rhenium, silver, platinum, palladium, gold, zirconium, hafnium, zinc, indium, tin, gallium and germanium, and alloys of any of these elements. Other elements such as magnesium or lithium may also be present. In some preferred embodiments, the metal particles comprise a superalloy; that may be used, for example, in 3D printing of jet engine parts. In some preferred embodiments, the particles, either individual particles within a mixture or the sum of all particles in a mixture comprise at least 80 mass % or at least 90 mass % of a single element. In alternative embodiments, in place of metals, the core particles may be ceramic, for example, oxides, nitrides, and carbides, or polymeric, for example ABS, PLA, PVA, Nylon, HDPE, PETT, or other materials, for example carbon fibers or biological materials. For purposes of the present invention, the core particles have a surface (or are coated with a layer which has a surface) that reacts under conditions of ALD or MLD to form a surface layer. In some preferred embodiments, the surface that reacts under conditions of ALD or MLD is a metal or metal oxide surface. For purposes of the present invention, metals may include semi-metals.

The particles, including any coating, have diameters typically in the range of 0.01 to 500 μm; preferably 10 to 300 μm; preferably 10 to 100 μm; and in some embodiments, at least 90 mass % of the particles have a diameter of 100 μm or less. For asymmetric particles, particle size is typically determined by optical microscopy based on the smallest dimension through the center of a particle.

The core particles preferably possess one or more of the following characteristics: spherical, spherical with satellites, identical chemical composition, little or no internal porosity, and/or low surface contamination. Satellites are nodules on the exterior of larger (usually spherical) particles. Satellites are typically formed during the production of the core metal particles, especially during the production of these materials from gas atomized processes. When gas atomization is used, the particles are produced in a range of sizes which coalesce together. The satellites are the relatively small particles which attach to the larger particles during the production.

The coating may comprise any coating that can be applied by molecular or atomic layer deposition. Some well-known coatings that can be applied to the metallic or other material core particle may comprise: oxides or mixed oxides (e.g., $Al_2O_3$, $TiO_2$, ZnO, $ZrO_2$, $SiO_2$, $HfO_2$, $Ta_2O_5$, LiNbxOy), nitrides (e.g., TiN, TaN, $W_2N$, $TiY_2N$), sulfides (e.g., ZnS, CdS, SnS, $WS_2$, $MoS_2$, $ZnIn_2S_4$), and phosphides (e.g., GaP, InP, $Fe_{0.5}Co_{0.5}P$). Some lesser known materials that can be applied to the core particle may comprise: metal fluorides (e.g., $AlF_3$, $MgF_2$, $ZnF_2$), oxy fluorides and oxy nitrides of transition metals (e.g. of Al, Cu, Co, W, Cr, Fe, Zn, Zr, Pt, Pd), lanthanides in either elemental, oxide, fluoride, nitride, boride, or sulfide form (e.g., Y, YN, $La_2O_3$, $LaF_3$, Nb, $Dy_2O_3$, Nd, $LaB_6$, $La_2S_3$ etc), borides (e.g., $TiB_2$), carbides (e.g., $B_4C$, WC), silanes, silicides and other silicon containing materials, carbon-containing materials including, but limited to, polymers (e.g., polyamides, polyethylenes, polyamides, polyureas, polyurethanes), hydrocarbons, polymers or fragments of amino acids or other biological-related molecules and polymers, and other materials), fluorinated polymers (e.g., fluoro or perfluoro-polyamides, -polyethylenes, -polyamides, -polyureas, -urethanes, -hydrocarbons). This coating is highly uniform over the particle; preferably, there is no more than a 20%, more preferably no more than 10%, or no more than 5% variation in coating thickness over the surface of the particle. This high level of uniformity is a characteristic of the ALD/MLD process. Particles coated by ALD/MLD are distinguishable from particles coated by other methods by 1) the uniformity of film thickness and 2) the lack of change in particle size distribution of the individual core particles, which are not possible with other techniques.

Coatings, on core powders, typically have a thickness in the range of 0.1 to 100 nm; preferably 0.2 to 50 nm; more preferably 0.5 to 10 nm. Coating thickness can be measured by transmission electron microscopy (TEM).

The ALD/MLD coating preferably covers at least 60% of the surface, more preferably at least 80%, more preferably at least 95% and still more preferably at least 99% of the surface area of the particles.

The ALD/MLD coating preferably is conformal. By "conformal", it is meant that the thickness of the coating layer is relatively uniform across the surface of the particle (so that, for example, the thickest regions of the coating are no greater than 3 times, preferably not greater than 2 times, in some embodiments not greater than 20% thicker than the thickness of the thinnest regions).

In processes for making coatings (and the resulting coated particles) that include hydrocarbon reactants, it may be desirable for hydrocarbon reactants to be partly or completely fluorinated in which fluorine replaces hydrogen in the hydrocarbon chain connecting reactive moieties; for example, the reactants (or films) may comprise a F/H atomic ratio of at least 0.1 or at least 0.5, or at least 1; or at least 5, or at least 10. In many preferred embodiments, the hydrophobic films should not be readily hydrolyzable, so, in some embodiments, the films do not contain anhydride linkages; similarly, in some embodiments, metal atoms may not be desirable, and, in some embodiments, the films comprise less than 10 mass % or less than 5 mass %, or less than 1 mass % transition metals in the outer (surface) 2 nm or 5 nm or 10 nm of film thickness; and, in some embodiments, the same limitations apply to semimetals.

3. Rheology 3D printing uses powders that do not flow perfectly. When a layer of powder is added to a bed to make a part, if it does not flow well, defects in the part can result from voids in the powder bed. The powder layer is optimally a dense bed of powder which is 30-100 μm thick. The present invention provides a method for increasing the flowability of metal powders. This invention, in some embodiments, improves the flowability of the powder to reduce voids in the bed and lower defects in the final part.

Powder size has a significant effect on the rheology of the particles as well. Smaller powders tend to be more cohesive (sticky) and result in less reliable spreading, shaking or otherwise moving the powder to form layers. Additionally, smaller powders, especially of metals and non-oxide ceramics, typically have a higher oxygen content that tends to predominate on the surface. When the oxygen is included in the finished part, it changes the composition of the finished part, typically in a negative way. However, smaller powders allow for finer feature sizes as well as a smoother surface finish to the finished part. This invention, in some embodiments, allows for use of smaller metal or non-oxide ceramic particles for AM without increasing oxygen content of finished parts.

The particle coating can be applied by alternating cycles according to the ALD process. Surprisingly, we have discovered that at least 5 cycles of the ALD process resulted in a substantial increase in flowability. Preferably, at least 10 cycles or at least 25 cycles of ALD are conducted for increased flowability and oxidation resistance. In some embodiments, the ALD process is conducted for no more than 50 cycles or no more than 100 cycles, above which has been found to have little additional effect.

In some preferred embodiments, the ALD coating comprises alumina.

In some embodiments, the ALD process increases flow factor by at least 10%, or at least 20%, or in the range of 5 to about 40%. Flow factor may be measured at a Major Principal Consolidation Stress of 5 or 10, preferably tested in a Brookfield Powder Flow Tester (PFT3115) equipped with a PFT-405 5" sample trough and a PFT-515 F'" 304 SS vane lid; alternatively, flow factor can be measured according to ASTM $B_{213}$-17 using the Hall flowmeter funnel or, if the powder doesn't flow through the Hall flowmeter funnel then Test Method $B_{964}$ in a Carney Flowmeter funnel. In some preferred embodiments of the invention, the coated powders can be described as having ±50%, or ±30%, or ±10% of any of the values that are shown in the Examples section; these values may be in conjunction with one or any combination of the other descriptions provided herein.

ALD and MLD processes produce unique physical properties. Powders that are coated by an ALD or MLD process can be identified, or alternatively, characterized, by their measurable properties; and, therefore, the particles are distinguishable from powders made by alternative methods. For example, by common spectroscopic methods. In some embodiments, the powder can be characterized by a flow factor of at least 10, or a flow factor in the range of 10 to 15, as measured according to the apparatus and conditions described above (also see the Examples).

4. Chemical Reaction Resistance

Some powders for 3D printing can be prone to oxidation or absorption of water, leading to undesirable elemental composition or poor rheology characteristics. By coating with an $H_2O/O_2$—barrier coating (~10 nm or less), and optionally drying the powder in a vacuum, we can extend the shelf life of powders for 3D printing.

Some preferred coating methods utilize one or more cycles of reaction with an oxidant source such as water, $H_2O_2$ or $O_3$, followed by reaction with trimethyl aluminum (TMA) or diethyl zinc (DEZ). More generally, a powder can be exposed to one or more dose of chemical (e.g., TMA) to modify surface groups and lower the strength of particle-particle interactions by, for example, changing an Al—OH surface to an Al—X surface where X may equal: $CH_3$, N, F, S, and others.

The coating can be, for example, a hydrophobic organic coating such as an imide or fluorinated organic; which could be deposited after one or more cycles of applying an inorganic coating.

Some preferred powders have oxidation resistance such that there is no substantial increase in mass, as measured by thermal gravimetric analysis, by heating at 10° C./min to 450° C. in oxygen; in some embodiments, an increase of mass of 5% or less, 3% or less, or 1% or less; and, like any of the properties discussed herein, in some embodiments, the particles may be characterized by any selected combination of the properties, for example oxidation resistance with particle size and or composition. The invention also includes methods of additive manufacturing using powders as described herein.

Most metal powders comprise a native oxide surface layer. This surface layer can often inhibit diffusion of metal atoms, leading to poor sintering, or higher temperatures required for sintering. Another embodiment of the invention is coating of a material onto the metal powder where the coating material is less stable than the native oxide on the powder. For example, a ZnO coating on an aluminum powder. In this embodiment, the less stable material (ZnO deposited by ALD or ALD-like techniques) enables or enhances diffusion of the metal atoms from the powder to enhance sintering. In this aspect of the invention, "less stable" means that the powders sinter together with less energy than the powders with native oxide. This less stable material could be coated onto the powder immediately after an etch process (e.g., Atomic Layer Etching or Spontaneous Etch), such that the original native oxide (e.g., $Al_2O_3$) is substantially "replaced" with the new material (e.g., ZnO), to enable better sintering. For example, in the table below, any oxide higher in the list than the native oxide could be used to replace the native oxide.

| Oxidation Reaction | Standard Free Energy of Oxide Formation (kcal/mol $O_2$) |
|---|---|
| $4Ag + O_2 \rightarrow 2Ag_2O$ | −5.18 |
| $4Cu + O_2 \rightarrow 2Cu_2O$ | −69.96 |
| $2Pb + O_2 \rightarrow 2PbO$ | −90.5 |
| $4Fe_2O_3 + O_2 \rightarrow 6Fe_2O_3$ | −93 |
| $2Ni + O_2 \rightarrow 2NiO_2$ | −103.4 |
| $2Fe + O_2 \rightarrow 2FeO$ | −116.8 |
| $3Fe + 2O_2 \rightarrow Fe_3O_4$ | −121.2 |
| $Sn + O_2 \rightarrow SnO_2$ | −124.2 |
| $6FeO + O_2 \rightarrow 2Fe_3O_4$ | −134.4 |
| $4P + 5O_2 \rightarrow 2P2O_5$ | −146.1 |
| $2Zn + O_2 \rightarrow 2ZnO$ | −152.1 |
| $4Cr + 3O_2 \rightarrow 2Cr_2O_3$ | −166.8 |
| $2Mn + O_2 \rightarrow 2MnO$ | −173.6 |
| $Si + O_2 \rightarrow SiO_2$ | −192.4 |
| $Ti + O_2 \rightarrow {>}TiO_2$ | −203.8 |
| $4Al + 3O_2 \rightarrow 2Al_2O_3$ | −251.18 |
| $2Mg + O_2 \rightarrow 2MgO$ | −272.26 |
| $2Ca + O_2 \rightarrow 2CaO$ | −288.8 |

More specifically, a less stable coating is used to replace a native oxide where "less stable" is defined as enabling sintering at lower thermal inputs, for example, where a powder with native oxide requires a thermal value X in order to sinter, the powder with a less stable coating replacing the native oxide requires less than X (for example 0.9X or 0.8X or less) to sinter equally. Thus, whether a coating is less stable can be established by routine experimentation.

The particles or particle bed can be characterized as having a carbide, nitride, or organic coating. In addition, or alternatively, the particles or particle bed can be characterized as having an average of less than 1 nm of oxide, or less than 0.5 nm of oxide, or substantially no oxide on the surfaces of the particles.

Another characteristic advantage of the ALD/MLD coated particles can be reduced susceptibility to water condensation to improve rheology and enable powders to be reused more times before being refined or otherwise modified to bring the powder back into specification. By modifying surface chemistry groups to be less hydrophilic, the amount of water absorbed by the powder over time can be lower, leading to less oxygen incorporation to the powder. More generally, a surface chemical modification to prevent unwanted chemical species reacting with the powder can be achieved by and ALD or MLD coating. For example, applying $Al_2O_3$ ALD onto Ag or Li powders or parts can prevent reaction of the powder or part with atmospheric or environmental species such as sulphur, oxygen, water, nitrogen and others. The ALD coating acts as a barrier to prevent these species from interacting with the underlying powder or part. Other embodiments use other ALD coatings such as fluorides, nitrides, carbides, etc.

5. Formation of Cermets

A ceramic coating can be applied to metal powders to form a cermet. ALD can be used to coat a metal particle with a ceramic coating; the resulting powder can be printed into a desired shape in the form of a cermet—a composite material with metallic and ceramic phases. For example, 3D printing conditions can be controlled so that particles having an ALD applied coating (e.g., metal oxide, metal nitride or metal carbide) result in a printed composite having a respective phase (e.g., metal oxide, metal nitride or metal carbide phase) either dispersed in a metallic matrix or as thin layers separating metallic regions.

6. Oxygen Inclusion Mitigation

Add rare earth elements (REE) to a particle coating to bind oxygen. The oxygen in Al can exist in isolated islands or deposits of $Al_2O_3$; and advantageously, can form dense surface layers to protect the underlying metal. In Ti, the O is more soluble and tends to move toward the interior of a particle. The placement of a REE on the exterior of a particle will retard oxidation of the bulk metal.

7. Surface Properties

ALD/MLD can be used to apply uniform surface coatings that reduce the surface tension of melt pools. In some embodiments these coatings are used to have a beneficial effect on the final microstructure of the part by affecting grain growth, precipitation and other microstructure-related properties. See Page 107 of '2017—Chen et al., in J. Mater. Processing Tech. "Improving additive manufacturing processability of hard-to-process overhanging structure by selective laser melting (SLM)" state that adding "small amounts of surface-active elements, such as boron and niobium, into original powders. Surface-active elements have the function of reducing surface tension of melt pool during SLM. This is of great help to increase the melt pool stability and improve the processing quality of overhanging structure by SLM." In the present invention, coatings are applied to the particles that reduce surface tension and improve the melt pool stability and will reduce capillary action, reducing the tendency for the melt to take up particles from the print bed and produce dross. The coatings are especially advantageous because the surface-active elements or compounds can be concentrated on the particle exterior, there is better control of composition and the resulting printed article will have superior properties; and the combination with better flowability creates a synergistic advantage over uncoated particles. Examples of such coatings include sulfur-containing materials (e.g., but not limited to: ZnS, CaS, BaS, SrS, CdS, PbS, $In_2S_3$, $CU_xS$, $WS_2$, $TiS_2$, $Sb_2S_3$, SnS, GaSx, GeS, $MoS_2$, $Li_2S$), Boron containing materials (e.g., not limited to $TiB_2$, $B_2O_3$, BN, TaB, $TaB_2$, B-doped ZnO, $W_2B_5$, $AlB_2$, $B_4C$, $Mo_2B_5$, $Re_2B_5$, $Os_2B_5$). Tantalum containing materials (TaN, TaB, tantalum oxides etc) and Nb-containing materials (e.g., niobium oxide, NbN,) Alternatively, the active 'coating' may be applied by just a surface treatment of the powder with an exposure of the metal powder to the element-of-interest-containing chemical (e.g., for B these could be, for example, $BBr_3$, Tetrakis(dimethylamino)diboron, $B(C_2H_5)_3$, $B(OCH_3)_3$ $[(CH_3)_2CHO]_3B$, $B(CD_3)_3$, $(C_6H_5)_3B$, for S this would be, for example, $H_2S$, and for Nb there are several options)

In another embodiment, the ALD coating, or a layer within a multi-material ALD coating, modifies grain growth, typically inhibiting grain growth but in some embodiments increasing grain growth for high temperature alloys, where grain slippage lead to weakness, so fewer grains are desirable and single crystal parts are often the best performing at extreme high temperatures.). Examples of such grain growth controlling coatings include the coating listed above for reducing the surface tension of the melt pool as well as $AlPO_4$, $TiPO_4$, TiP, AlP, GaP, $Ni_2P$.

In some embodiments, the coating may function as a sintering aid. Because ALD forms a uniform and, typically, thin layer, the intermediates and product after sintering or other heat treatment has controlled properties at the interfaces between particles.

Hydrogen or forming gas can be used to reduce oxides during ALD deposition to create metal coatings, or to reduce oxide ALD coatings just prior to use. This would work best if it could be done within a 3D printing system, especially after particles have been deposited in a powder bed. Especially with metal particles, if the surface oxide is removed, the particles have a tendency to aggregate (or sinter loosely). Thus they are not optimally flowed or dispersed onto the print test bed.

8. Etching

In some embodiments, a coating layer or a contaminate film (for example, an unwanted surface oxide) can be removed prior to use, preferably immediately prior to use, such as by atomic layer etching (ALE). ALE could be conducted on recycled particles to refresh or "activate" them for reuse by removing unwanted material or elements (for example oxygen or metals, or metal nitrides, or other elements or compounds). This process may be either true ALE (self-limiting by exposure) or spontaneous etching of surface material (such as spontaneous etching of an oxide from the surface of a metal powder upon exposure to HF gas). In some embodiments, this ALE or spontaneous etch process has the added benefit of modifying the original surface chemistry from, e.g., an oxide, to another surface chemistry, e.g., fluoride, oxifluoride. This new surface (if a fluoride) should be less hydrophilic than the original surface (e.g., if originally oxide/—OH surface). The less hydrophilic surface is beneficial to reduce the oxygen/$H_2O$ uptake by the film during storage, or during operation. The added advantage is also that the fluoride is often more thermodynamically stable than the oxide, so the fluoride will not convert back to the oxide.

In any of the inventive methods, the particles can be subjected to an etching step or reducing step prior to ALD/MLD.

9. Pyrophoric Resistance

Another use for the coatings is to protect flammable powders from ignition or reduce the pyrophoric nature of such powders. These powders may include fine metal powders which are pyrophoric below a certain particle size such as titanium, aluminum, or zinc powders, or especially pyrophoric powders such as hafnium, zirconium, tin, or alkali metals such as calcium and magnesium. Coatings may also be used to prevent smoking (particles blowing around in printers due to thermal air currents). A film which optimizes the cohesion of the particles can be created with ALD films. These films create a balance between increased flowability of powders desired for reliable casting of each powder layer while providing a film which is just cohesive enough that the particles are less susceptible to smoking. The smooth and highly uniform nature of the ALD/MLD coatings enable excellent flowability while the molecular forces between particle coatings prevents smoking. Moreover, ALD/MLD is able to completely cover the surface with less material than other methods, enabling safe operation with superior results. Pyrophoric powders are generally recognized, and in some embodiments can be defined as having the ability to spontaneously ignite at 10% humidity and standard pressure.

10. Anti-Reflection

The precise thickness and composition of coatings on particles for additive manufacturing can be selected/controlled to reduce reflection of the applied laser beam. The coatings may be any material deposited by ALD or MLD e.g., ($MgF_2$, ZnO, Zn, polyamides, fluorocarbons, etc). A film (e.g., a metal film) may provide high crystallinity. Such as a coating of highly crystalline, nano-nodules on the surface of the main particles may result in enhanced diffraction and scattering of the laser, potentially leading to reduced reflectivity. ALD can be used to form nanonodules on the particle surfaces—a very low level of coating of a highly crystalline material or a film which does not readily nucleate onto the support will grow in islands of film. Additionally, selecting an ALD film that grows preferentially on itself then the islands will grow larger as opposed to growing more islands. Alternatively, a nano-laminate of alternating layers can decrease reflectivity. The nano-laminate is designed for alternating high and low indices of refraction to maximize absorption. The coating thickness and composition can be selected to optimize absorption of the laser wavelength. The coating enhances absorption of energy, reduces the input energy needed to sinter or melt the powder to form the part. This lower input energy may be in the form of a faster scan speed and corresponding faster part production, a lower energy laser being required, or a lower energy cost for running the system. The powders can be coated with coating comprising one or more chromophores such as a polymer comprising unconjugated double bonds, to absorb laser light to speed sintering and increase efficiency.

ALD or MLD can be used to form multilayer coatings to enhance absorption of laser radiation. These multilayer coatings have two, three, or more layers of different compositions; and suitable compositions can be selected by known optical science. Preferably, the anti-reflective coatings increase absorption (or decrease reflectivity) by at least 1%, 2%, or at least 5%.

11. Mixing Enhancements

One problem in powder industries is creating uniform blending of powders. Powders often segregate due to mismatches in surface chemistry and particle size. Modifying the surface chemistry enhances intermixing of two or more powders and leads to better processing and part formation. Another method provided by the present invention is the application of identical coatings onto different particles to improve mixing. In one embodiment the same ALD coating is applied to two or more powders. In another embodiment, the coating is chosen to mimic the surface of one powder and is only applied to the second powder. Coatings of a given material may be applied to one or more powders to create a better blended powder mix. For example, when trying to create a blend of powder X and Y, one could coat powder X with the surface chemistry present on Y. Thus, both powders would have the same surface chemistry and would mix better. A specific example would be coating W metal powder with a carbon coating such that, when the W metal powder is mixed with a carbon powder (to eventually print a WC part), the surface chemistry on all particles is C-based. Alternatively, one could readily modify the surface functional groups on the carbon to add WOx (tungsten oxide) functional groups on the surface of the carbon. This second approach would lead to WOx surface groups on all particles which, again, would lead to better mixing and less segregation. Thus, particles having different core compositions have substantially similar or identical surface chemistries to enable better mixing and less segregation prior to, or during, formation of a printed part. This concept expands to multiple material powders where the number of different powder materials is preferable 2-10, more preferably 2-5, or more preferably 2-3.

In another example, a carbon-containing coating applied over metal (eg tungsten) particles. When a W metal powder is mixed with a carbon powder (to eventually print a WC part), the surface chemistries on all particles is C-based. Alternatively, one could readily modify the surface functional groups on the carbon to add WOx (tungsten oxide) functional groups on the surface of the carbon. This second approach would lead to WOx being the surface groups on all particle, which, again would lead to better mixing and less segregation. This concept expands to multiple material powders where the number of different powder materials is preferable 2-10, more preferably 2-5, or more preferably 2-3. Tungsten can be applied to particle surfaces by known ALD processes; see, e.g., Herrmann et al., "Multilayer and functional coatings on carbon nanotubes using atomic layer deposition," Appl. Phys. Lett. 87, 123110 (2005). Tungsten oxide can be bonded to the surface of C particles through defects in the carbon such as edge defects, or O-containing defects that may be either present in the substrate or generated in the substrate through pretreatment with plasma or $O_3$.

12. Binder Jet Coatings

ALD or MLD can be used to apply organic or other removable coatings onto metal or ceramic particles. After forming the particles into a shape, the coatings can be removed (such as by combustion) to yield a porous part that can be fully densified by further heating. ALD/MLD increases the density of green parts (fabricated using binder jet processes). ALD/MLD coatings on the particles that enable stronger binder-particle interactions, or lead to stiffer, or more dense, green parts are advantageous. In one embodiment, an ALD/MLD coating is applied to the particles that is designed to chemically react with a binder to enable stiffer and denser green parts. In another embodiment the ALD/MLD coatings are designed to interact with the binder in a beneficial manner without covalently reacting (e.g., benzene-ring based coatings on powders to lead to pi-pi stacking interactions with binder (for aromatic-containing binders). In yet another embodiment, ALD/MLD coatings are applied to particles that are added to the binder before the binder is sprayed onto the powder bed. The powder in the powder bed is also coated with and ALD/MLD layer(s). The coatings are designed to interact with each other such that a denser green part is formed. In yet another embodiment, the ALD coating is applied on just the powder and the ALD/MLD coating acts as an initiator, "setting" or "polymerizing" the binder upon contact with the powder to create a stiffer, more dense green part.

Currently, binders for powder jet processing are composed of furfuryl alcohol, bisphenol A, or resorcinol. The phenolic binders will bond more readily to a methylated surface versus a hydroxylated surface. One example would be to coat a particle with aluminum oxide with TMA/$H_2O$ chemistry, however instead of terminating the chemistry with a water dose, the process is ended on a TMA cycle. This will leave methyl groups on the surface which would be available to react with the phenolic materials. Alternatively a C-containing ALD/MLD chemistry (e.g., a polyamide) could be terminated with a non-hydrolyzable group (e.g., methyl group on a carbon chain) to facilitate better, more stable interaction with the binder.

In some embodiments, an ALD or MLD process can be used to apply reactive groups on the exterior of particles that activate during the additive manufacturing process. For example, the reactive groups could be blocked with blocking groups that ring open or otherwise activate by application of heat, light (photoactivate), electron beam, or catalyst (e.g., catalyst applied in a liquid or gas phase); activation could occur simultaneous with or subsequent to formation of an aggregated layer or green body. One example would be to coat a particle with an MLD chemistry which contains a concealed functionality that only expresses itself upon reaction. Many ring-opening reactions yield hydroxyl, amine, or carboxylic acid groups upon reaction. For example, a cyclic azasilane (AZ), such as 2,2-dimethoxy-1,6-diaza-2-silacyclooctane (CAS 182008-07-7), can react with a surface hydroxyl to create a silicon-oxygen bond. The cyclic azasilane also unfolds, leaving amine species that are not expected to be reactive with surface hydroxyl groups. A cyclic carbonate, such as ethylene carbonate (EC) (CAS-96-49-1), can then react with a surface amine to form a urethane linkage. The ethylene carbonate also unfolds and produces hydroxyl species that are not expected to be reactive with surface amine groups. This chemistry could be terminated at any of the steps, leaving a blocked group which optimally opens up during the formation of the green body allowing for increased adhesion of the particles together.

13. Core Particle Melting/Sintering Resistance

In some optional embodiments, the coating has a melting point that is higher than the melting temperature of the core; in some these cases, during the additive manufacturing process, the core may soften prior to the coating. One embodiment of this would be the development of a film which prevents the particles from undesirably sintering together in a heated bed or under pressure during the printing process. This feature is not present in all embodiments of the invention; however, the invention, can, in alternative embodiments, include this feature in any of the embodiments described herein.

In another embodiment of the invention, coatings of a given material may be applied to one or more powders to retard sintering of one material in a powder that comprises two or more materials. One problem in creating materials such as cermets or other composite metallic/inorganic materials (such as metal matrix composites, MMCs, or multilayer metal/ceramic structure like multilayer ceramic capacitors, MLCCs) is that the metal components typically sinter at much lower temperatures than the inorganic (ceramic) components. The method here is the coating of the metallic, or more generally, the lower sintering temperature powder or material, with a coating that slows, reduces, retards or otherwise impacts the sintering of the metallic or lower sintering temperature material. In some preferred embodiments, this coating increases the sintering temperature of the lower sintering temperature material. By increasing the sintering temperature of the lower sintering temperature material to be closer to that of the higher sintering temperature material, a more uniform composite material can be created as less segregation occurs during sintering. A specific example would be coating a metal powder (e.g., Ni) with an oxide coating (e.g., Lithium titanate) such that when the metal (Ni) is sintered alongside a ceramic material (e.g., titanium carbide, $BaTiO_3$, etc), the sintering is enhanced such that segregation of the materials is less than without coating one of the two components. Cermet and MMCs materials may include carbides or nitrides of titanium, tantalum, tungsten, niobium, or molybdenum, and other materials combined with a binder of nickel, cobalt, molybdenum and other materials.

14. Coatings That Enable Better Cold Spray Processes

A coating can be applied by ALD/MLD that will reduce the drag on the patricles when jetted towards the build plate (cold spray or direct energy techniques). These films could include fluorocarbons, aluminum flourides (any transition metal flouride), polyamide or polyimides, polyurethane, polyureas, and base hydrocarbons.

A coating can be applied by ALD/MLD that will increase the sticking coefficient of the cold spray particles to one another. This could include a material which is soft and deformable or could be a sintering aid for the core particle of interest. The energy of impact is enough for local sintering. For example, a polymer coating that has a lower thermal conductivity may be applied to a metal powder by ALD/MLD, such that the energy of impact is contained more locally at the point of impact. This could provide for finer control of feature size.

15. Coatings onto Powders for Better Filaments (Inks) for Extrusion-Based 3D Printing.

One element of the innovation is to enhance the dispersion of the powders filling the resin or liquid matrix (e.g., solvent or dispersant). This can allow for both better uniformity as well as the enablement of higher solids loading without negatively impacting the processing of the filled resin or ink.

16. Using an ALD-Like Process During Printing to Remove $H_2O$ or $O_2$ from the Printing Environment.

The use of TMA (or other suitably reactive gas) in a print bed during the print process to remove $H_2O$ from the atmosphere in the printing environment. This will reduce the oxidation of the materials both powders and the produced part. The reactive gas would act as an in situ "getter" to react unwanted species and thus precipitate the reaction product out of the gas phase, mostly where the part is not being formed. This would mostly remove unwanted $H_2O$, O or other unwanted species from the printing environment.

17. Coatings and Etchings for Elemental Additions and Subtractions to Make Tailored Alloys ALD/MLD can be used to add small amounts of elements or compounds to powders to make tailored alloys. Atomic Layer Etching or spontaneous etching can be used to remove targeted elements or compounds to powders to make tailored alloys. Current AM powders are sold to conform to an elemental composition specification which defines the specification typically with ranges, or upper or lower boundaries. In reality, an AM process may require more or less of a specific element or compound. Thus, this embodiment of the invention provides for custom alloy generation before or during part fabrication.

Another embodiment of this invention is to perform ALD-like processes during printing to add back into the powder/part/build low concentrations of elements or compounds that are volatilized by the laser and thus are not present in the final part. ALD/MLD-like processes in this embodiment would enable replacement of wanted elements/compounds that would otherwise be deficient in the final part. Such deficiencies can lead to poor part performance due to problems relating to microstructure, for example.

18. ALD/MLD Coatings onto Intermediate Fabricated Parts

Densification—add a sintering aid to the formed green body. This will reduce the amount of material added into the finished part because the touch points between the particles are not needed to be coating.

Mechanical Stabilization—add a higher structural film prior to moving from the BJP (binder jet printer) or extrusion tool. This film will improve the structure of the part before the material is finally densified. The coating is not necessarily done in the same tool, it could be done external to the 3D printer before final firing.

Improve the wicking of bronzing materials. A thin film of another metal onto the part will provide a good wettable surface for the bronzing material to flow well into the pores. There are some films which would enhance the flowability of the materials.

EXAMPLES

Materials and Methods

For evaluation of the rheology and some other benefits of the invention and various described coatings above, tests have been developed and performed on core metal powders with coatings. Below is a discussion of the methods and results of such tests.

Procedure

The procedure used for each run is listed below.
1. For each sample number shown in Table 2, a 75 ml atomic layer deposition (ALD) reactor was loaded with ~100 g of an AlSi10 Mg powder. The reactor was evacuated and the powder was allowed to desorb water at room temperature overnight. This was done to limit any reaction between the water and the hot substrate powder. The residual gas analyzer (RGA) detected only water desorption from the bed.
2. The following morning, the reactor was heated to 180° C. and the powder was dried for 4 hours.
3. The powder was coated with the relevant number of cycles according to Table 2. The RGA was used to detect gas phase products ensuring the deposition was consistent with that of alumina.
4. The reactor was cooled to room temperature and pressurized.
5. The powder was recovered and packaged.

TABLE 1

Dose Recipe

| Step | Time | Valve 1 | Valve 2 | MFC1 | MFC2 |
|---|---|---|---|---|---|
| Dose TMA | 300 | 1 | | 5 | 5 |
| Purge TMA | 150 | | | 10 | 10 |
| Dose H2O | 300 | | 1 | 5 | 5 |
| Purge H2O | 600 | | | 10 | 10 |

Analytical Methods

Residual Gas Analyzer—The residual gas analyzer (RGA) is a mass spectrometer used to sample the effluent gas from the process. It provides real time information about the progress of the ALD process or any side reactions and is typically used for feedback control of the ALD process. The RGA also provides leak check and substrate degassing information.

Thermogravimetric Analysis for Oxidation—The thermogravimetric analyzer, TGA, is used as an ex-situ analysis tool to examine mass change behavior of a sample as it is raised to elevated temperature. An $N_2/O_2$ atmosphere is used while ramping the substrate to observe oxidation protection offered by the ALD film, and possible infer film effectiveness or thickness. Powder Flow Testing—The powder flow function of the materials was testing using the Brookfield PFT.

Results and Discussion

Table 2 summarizes the coating runs performed.

TABLE 2

Coating Runs performed

| ALDN ID | Cycles | Film | Load Mass (g) | Recovered Mass (g) | Drying Temp (° C.) | Coat Temp (° C.) | Drying Time (hrs) | Run Time (hrs) |
|---|---|---|---|---|---|---|---|---|
| T326a | 1 | Al2O3 | 105.2 | 104.6 | 180 | 180 | 4 | .25 |
| T327a | 100 | | 105.1 | 104.6 | | | | 23.2 |
| T328a | 5 | | 105.9 | 105.2 | | | | 1.4 |
| T329a | 50 | | 103.9 | 103.2 | | | | 12 |
| T330a | 25 | | 103.8 | 103.3 | | | | 6.4 |
| T331a | 0.5 | | 105.5 | 105.0 | | | | 0.1 |

TABLE 3

Precursor Consumption

| ALDN ID | Prec A Consump (g) | Prec A Theoretical (g) |
|---|---|---|
| T326a | — | — |
| T327a | 3.8 | 5.6 |
| T328a | 0.6 | 0.3 |
| T329a | 1.6 | 2.8 |
| T330a | — | — |
| T331a | — | — |

T326a

The material dried without issue, and fluidized well. The RGA data was consistent with the deposition of alumina.

TGA Analysis

The samples were tested in the TGA by heating them at 10° C./min to 450° C. in oxygen. Samples with 5 cycles or less were oxidized by these conditions, while 25 cycles and more showed no oxidation. The uncoated material showed appreciable mass loss with heating at lower temperatures which could be an indication of adsorbed water.

Powder Flow Testing

The powder samples were tested in the Brookfield powder flow tester to determine the flow factors as a function of the major principal consolidation stress. The results are shown in FIG. 1. As compared to the uncoated powder, the 0.5 to 50 cycle coatings increased the flow factor over the entire range tested, while the 100 cycle coating initially increased the flow factor, but the benefit decreased as the consolidation stress increased.

Figure 2:
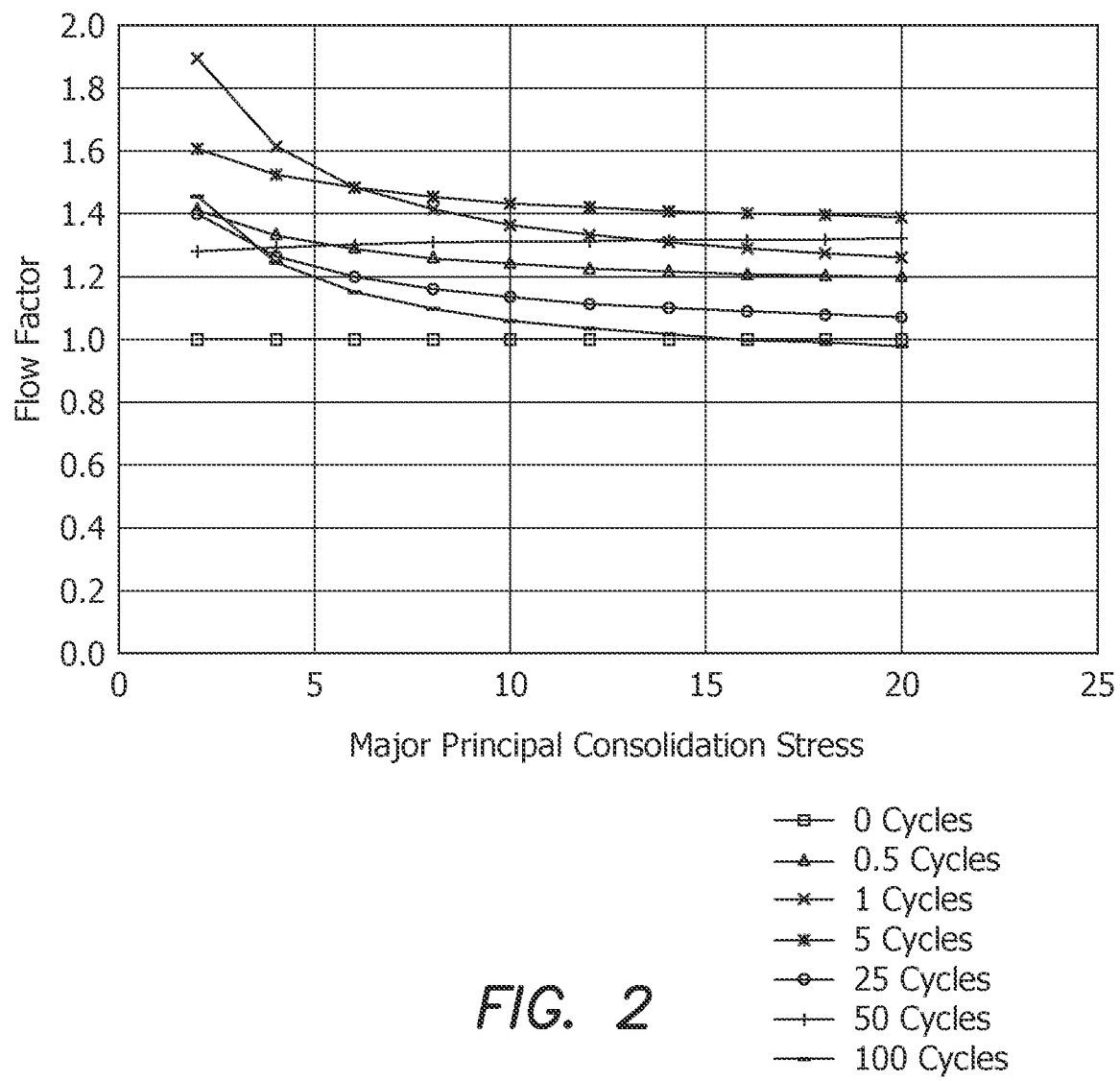
FIG. 2 shows is a normalized plot of the data in FIG. 1.

By normalizing the flow factor for a coated powder against the uncoated powder, the benefit of the coating can be seen more directly. See FIG. 2. The largest increase in flow factor was seen for the 5 cycle run. This was also the thickest film that still failed during the TGA test. The data shows the surprising result that substantial increases in flowability are observed with as little as 1 ALD cycle but 100 cycles, under higher consolidation stress shows decreased flowability; given a desire to enhance oxidation resistance, a desirable range is between 2 to less than 100 cycles, preferably 2 to 50 cycles or 2 to 25 cycles or 5 to 25 or 50 cycles. We note that the 50 cycle run curve displays a different shape than the other curves which may be an indication of a systematic error during either the coating run or the powder flow analysis.

Another test performed to evaluate the flowability of these powders is the Hall Flow test method which is recommended to be performed before the Carney Flow test. However, some fine powders may not flow through the smaller aperture of the Hall Flowmeter funnel. If a larger orifice is required, the Carney Flow test method may be used to determine a meaningful flow rate. Metal powder is timed as it flows through the calibrated orifice (5.08±0.13 mm in diameter) of a Carney Flowmeter funnel.

None of the AlSi10 Mg powders (as received, dried, or coated) would flow through the Hall flowmeter funnel. We, therefore, used the Carney flow test. The results for the Carney Flowmeter are:

| Sample | Carney Flow Test (s) |
|---|---|
| As received | No flow |
| 2 cycles $Al_2O_3$ | 25.02, 26.22, 27.97 |
| 15 cycles $Al_2O_3$ | 34.02, 30.40, 33.75, 32.49 |

Faster Carney flow times indicate more flowable powders. This test supports the Brookfield measurements indicating that there is an optimum film thickness for improvements in flowability.

Example 2: $Al_2O_3$ or $TiO_2$ ALD Coating onto Ti64 Alloy to Improve Oxidation Resistance Ti6Al4V (Ti64) powder was obtained from EOS. 300.0 g of Ti64 powder was loaded into a 150 mL reactor and installed into a Fluidized Bed Reactor. The substrate was heated to 185° C. for 15 hours to drive off any excess moisture. Once dry, the powder's fluidization properties were evaluated. The minimum fluidization point was approximately 10 sccm, so 30 sccm was used as the operational flow rate during the ALD coating. Either, 2, 5, 10 cycles of $Al_2O_3$ ALD or 15 cycles $TiO_2$ were deposited using standard processing conditions. The onboard residual gas analyzer (RGA) was used to detect when unreacted TMA, $H_2O$ or $TiCl_4$ broke through the bed during their respective cycles, thus ensuring complete surface saturation during each ALD cycle. After cycling, the reactor was cooled to room temperature, pressurized to atmospheric pressure, and the substrate was unloaded.

Figure 3:
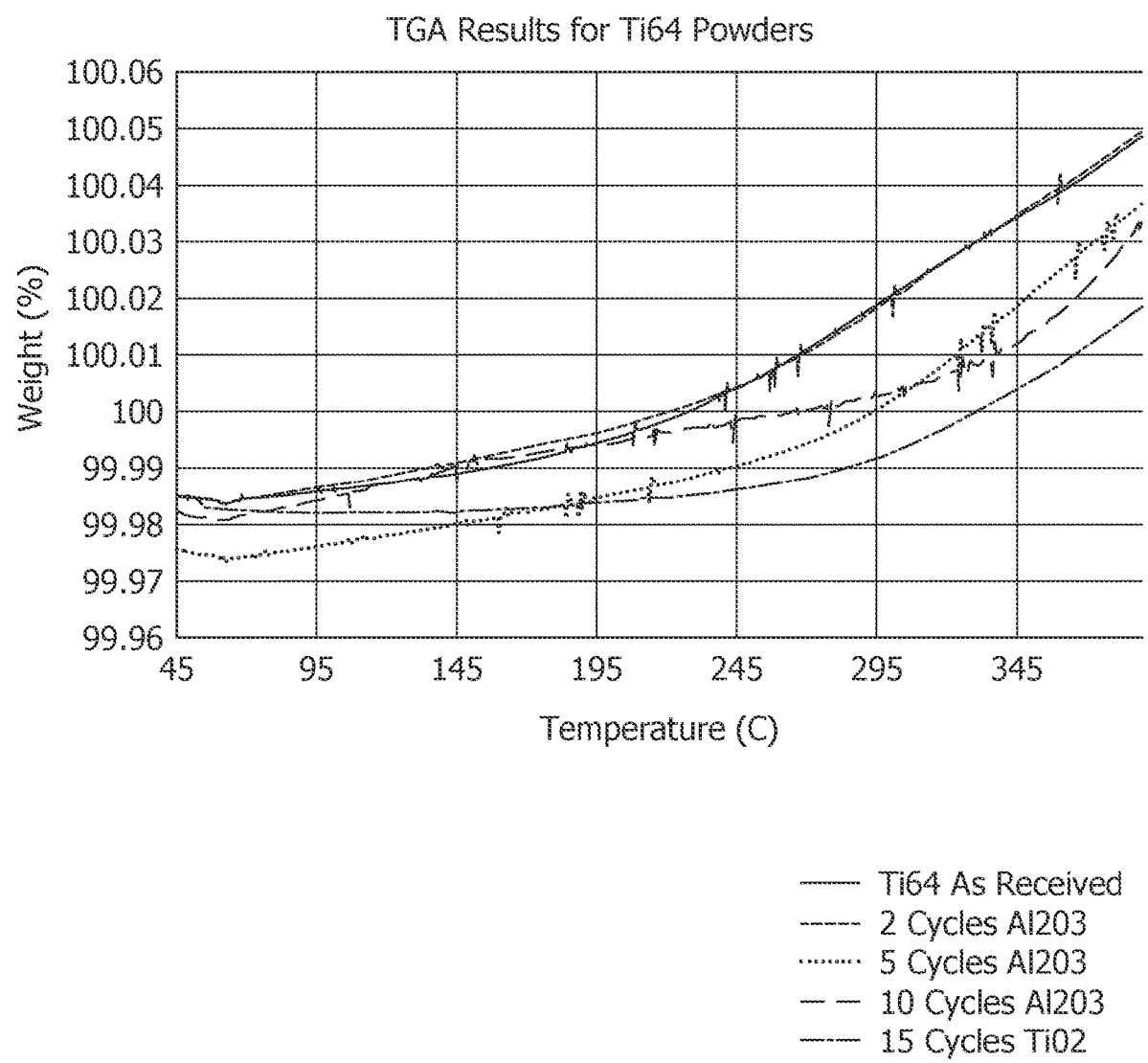
FIG. 3 shows the results of TGA testing of titania powders coated with alumina or titania ALD coatings.

The oxidation resistance of each sample and an uncoated sample were evaluated by TGA analysis. The samples were heated in air while the mass of each sample was measured. The results are shown in FIG. 3.

The powder oxidizing is represented as a mass gain during the heating. It is easily seen that the uncoated powder begins oxidizing rapidly at approximately 220° C. The 2 cycle $Al_2O_3$ does not change the oxidation on-set temperature significantly. By 5 cycles of $Al_2O_3$ the oxidation on-set temperature has shifted up to approximately 270° C. This is a significant increase in the oxidation resistance of the powder. Improvement in the oxidation resistance is not limited to Al$_2$O$_3$ coatings, it is also achievable through coatings of TiO$_2$ as evidenced by the 15 cycle TiO$_2$ coating increasing the oxidation resistance of the Ti64 powder to approximately 270° C.

Example 3: Use of Al$_2$O$_3$ ALD and a Capping Layer of a SAM to Improve Flowability of Stainless Steel Powders 10 kg of Stainless Steel powders were loaded into a 3 L Fluidized Bed Reactor vessel. Either 6 or 16 cycles of Al$_2$O$_3$ ALD were performed onto the powders in the manner of Example 1. This was followed immediately by exposure to a molecule which will form a self-assembled monolayer (SAM). The powders were cooled to 140° C. to provide the optimal conditions for the molecule chosen for this example. The powders were then exposed to FOMB(DMA)S (tridecafluoro-1, 1, 2, 2-tetrahydrooctylmethylbis(dimethylamino)silane). The FOMB(DMA)S dosing proceeded while monitoring the by-products with the RGA. The dosing continued until the by-product signals disappeared. This took approximately 16 hours under these conditions. The system was then cooled to room temperature.

These powders were testing via the Hall and Carney flow test systems. While none of the powders (coated or uncoated) flowed through the funnels, the powders coated with the silane treatment started to flow and then stopped before the full test was complete. This indicates a significant improvement to this highly cohesive powder. Visually, these powders have very different flow characteristics compared to the uncoated materials.

What is claimed is:

1. A method of making a shaped object, comprising:
providing a powder comprising core particles comprising a metal or ceramic core;
reacting the powder with a first reactant (reactant A) following by reaction with a second reactant (reactant B) in a process of atomic (ALD) or molecular layer deposition (MLD) in a sequential manner to produce a powder comprising an ALD/MLD coating having alternating, bonded reactant A moieties and reactant B moieties;
subjecting the coated powder to an additive manufacturing process to produce a shaped green product comprising core particles adhered together, either: suspended in a matrix comprising the ALD/MLD coating, or sintered together in the shaped green product suspended in a powder bed, wherein the powder bed comprises the powder comprising core particles having the metal or ceramic core and the ALD/MLD coating having alternating, bonded reactant A moieties and reactant B moieties; and wherein the method is further characterized by the following features: wherein ALD or MLD is conducted for 2 to 25 cycles; and further comprising a step of atomic layer etching.

2. The method of claim 1 wherein the powder comprising the ALD/MLD coating has a flowability that is at least 10% higher than the flowability of the powder having a metal or ceramic core without the ALD/MLD coating.

3. The method of claim 1 further comprising: heating the shaped green product to cause the core particles to sinter together.

4. The method of claim 1 wherein the core particles are metal and comprise at least 0.5 mass % of one or more rare earth element.

5. The method of claim 1 wherein the coating has a higher melting temperature than the core.

6. A method of making a shaped object, comprising:
providing a powder comprising core particles comprising a metal or ceramic core;
reacting the powder with a first reactant (reactant A) following by reaction with a second reactant (reactant B) in a process of atomic (ALD) or molecular layer deposition (MLD) in a sequential manner to produce a powder comprising an ALD/MLD coating having alternating, bonded reactant A moieties and reactant B moieties;
subjecting the coated powder to an additive manufacturing process to produce a shaped green product comprising core particles adhered together, either: suspended in a matrix comprising the ALD/MLD coating, or sintered together in the shaped green product suspended in a powder bed, wherein the powder bed comprises the powder comprising core particles having the metal or ceramic core and the ALD/MLD coating having alternating, bonded reactant A moieties and reactant B moieties; and wherein the method is further characterized by the following features: wherein ALD or MLD is conducted for 2 to 25 cycles; wherein a laser is used to bind the powder to form a green intermediate product; and wherein the coating is a nano-laminate comprising alternating high and low indices of refraction.

7. The method of claim 6 wherein the ALD/MLD coating comprises an ABC configuration deposited by the ALD/MLD process.

* * * * *